(12) United States Patent
Masaki et al.

(10) Patent No.: US 10,106,871 B2
(45) Date of Patent: Oct. 23, 2018

(54) NI-BASED ALLOY TUBE (71) Applicant: NIPPON STEEL & SUMITOMO METAL CORPORATION, Tokyo (JP)

(72) Inventors: Yasuhiro Masaki, Tokyo (JP); Manabu Kanzaki, Tokyo (JP); Kazuyuki Kitamura, Tokyo (JP); Shoji Kinomura, Tokyo (JP); Yumi Momozono, Tokyo (JP); Osamu Miyahara, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 25 days.

(21) Appl. No.: 15/513,242

(22) PCT Filed: Sep. 29, 2015

(86) PCT No.: PCT/JP2015/077594
§ 371 (c)(1),
(2) Date: Mar. 22, 2017

(87) PCT Pub. No.: WO2016/052551
PCT Pub. Date: Apr. 7, 2016

(65) Prior Publication Data
US 2017/0298478 A1    Oct. 19, 2017

(30) Foreign Application Priority Data

Sep. 29, 2014 (JP) ................. 2014-198759

(51) Int. Cl.
| C22C 19/05 | (2006.01) |
| B22D 7/00 | (2006.01) |
| C22F 1/10 | (2006.01) |
| C22F 1/02 | (2006.01) |
| G21D 1/00 | (2006.01) |
| F16L 9/02 | (2006.01) |
| B21C 23/00 | (2006.01) |

(52) U.S. Cl.
CPC .......... *C22C 19/058* (2013.01); *B21C 23/002* (2013.01); *B22D 7/005* (2013.01); *C22F 1/02* (2013.01); *C22F 1/10* (2013.01); *F16L 9/02* (2013.01); *G21D 1/00* (2013.01)

(58) Field of Classification Search
CPC ... C22C 19/053; C22C 19/055; C22C 19/056; C22C 19/058
See application file for complete search history.

(56) References Cited

U.S. PATENT DOCUMENTS

2007/0144622 A1* 6/2007 Flahaut ................. C22C 19/053
148/419

FOREIGN PATENT DOCUMENTS

| EP | 1 312 688 | 5/2003 |
| EP | 2 610 362 | 7/2013 |
| JP | 64-055366 | 3/1989 |
| JP | 08-029571 | 2/1996 |
| JP | 2002-121630 | 4/2002 |
| JP | 2002-322553 | 11/2002 |
| JP | 2003-239060 | 8/2003 |
| JP | 2007-284704 | 11/2007 |
| WO | 2013/146034 | 10/2013 |
| WO | 2013/150947 | 10/2013 |
| WO | 2013/191202 | 12/2013 |

OTHER PUBLICATIONS

Sudesh et al., "Photocurrent and capacitance . . . austenitic stainless steels", Corrosion Science 50 (2008) 23-34.

* cited by examiner

*Primary Examiner* — Jessee R Roe
(74) *Attorney, Agent, or Firm* — Clark & Brody (57) ABSTRACT

A Ni-based alloy tube includes a base metal having a chemical composition consisting, by mass percent, of C: 0.15% or less, Si: 1.0% or less, Mn: 2.0% or less, P: 0.030% or less, S: 0.030% or less, Cr: 10.0 to 40.0%, Ni: 50.0 to 80.0%, Ti: 0.50% or less, Cu: 0.60% or less, Al: 0.20% or less, N: 0.20% or less, and the balance: Fe and impurities; and a low Cr content complex oxide film having a thickness of 25 nm or smaller at least on an inner surface of the base metal, wherein contents of Al, Ni, Si, Ti, and Cr in the film satisfy [at % Al/at % Cr≤2.00], [at % Ni/at % Cr≤1.40], and [(at % Si+at % Ti)/at % Cr≥0.10].

4 Claims, 1 Drawing Sheet

NI-BASED ALLOY TUBE

TECHNICAL FIELD

The present invention relates to a Ni-based alloy tube that is low in Ni release even when used under a high-temperature aqueous environment for a long period, in particular to a Ni-based alloy tube suitable for an application such as a member for nuclear power plant.

BACKGROUND ART

A Ni-based alloy is excellent in mechanical properties and thus used for various kinds of members. In particular, a Ni-based alloy, which is excellent in corrosion resistance, is used for members of a nuclear reactor because the members are exposed to high-temperature water. For example, 60% Ni-30% Cr-10% Fe alloy or the like is used for members of a steam generator of a pressurized water reactor (PWR).

These members are to be used for several or several tens of years under an environment of high-temperature water at around 300° C., a reactor water environment of a nuclear reactor. A Ni-based alloy used for a heat-transfer tube for steam generators for nuclear plant contains a large amount of Ni, and thus is excellent in corrosion resistance and low in corrosion rate. However, a long period of use of the Ni-based alloy causes a very small amount of Ni to be released from its base metal.

The released Ni is transported to a reactor core portion in the process of circulating reactor water and irradiated with neutrons in the vicinity of fuel. Ni irradiated with neutrons is converted into radiocobalt through nuclear reaction. This radiocobalt has a very long half-life and continuously emits radiation for a long period. Therefore, when the release amount of Ni is increased, a periodical inspection cannot be started until the amount of emitted radiation is reduced to a proper value, which prolongs a period between periodical inspections, causing economic losses.

The reduction in the release amount of Ni is very important matter from the viewpoint of using a light-water reactor for a long period. For this reason, countermeasures to prevent the release of Ni in a Ni-based alloy have been taken so far by improving the corrosion resistance of a material and controlling the water quality of reactor water.

Patent Document 1 discloses a method in which a heat-transfer tube of a Ni-based alloy is subjected to annealing in an atmosphere at a degree of vacuum of $10^{-2}$ to $10^{-4}$ Torr and within a temperature range of 400 to 750° C. to form an oxide film mainly containing a chromium oxide, improving general corrosion resistance.

Patent Document 2 discloses a method for manufacturing a member for nuclear power plant in which heat treatment is performed in an oxidizing atmosphere at $10^{-3}$ Torr to atmospheric pressure after the solution treatment of a Ni-based precipitation strengthened alloy, the heat treatment also serving as at least part of age hardening treatment and oxide film forming treatment.

Patent Document 3 discloses a method for manufacturing a Ni-based alloy product in which a Ni-based alloy product is subjected to heat treatment in a hydrogen atmosphere or a mixed atmosphere made of hydrogen and argon, both the atmospheres having a dew point ranging from −60° C. to +20° C.

Patent Document 4 discloses a method in which an alloy work piece containing nickel and chromium is exposed to a gas mixture made of steam and at least one kind of nonoxidative gases to form a chromium enriched layer.

Patent Document 5 discloses, as a heat treatment method by which a double-layered oxide film is generated on the inner surface of a Ni-based alloy tube reliably and with a high degree of efficiency, the double-layered oxide film suppressing the release of Ni under a high-temperature aqueous environment, a heat treatment method in which at least two gas supply devices are provided on the delivery side of a continuous heat treat furnace, or a gas supply device is provided on each of the delivery side and the entrance side of the continuous heat treat furnace, then, using a gas introduction tube that penetrates the furnace and one of these gas supply devices, the inside of a working tube to be charged into the heat treatment furnace is supplied with an atmospheric gas made of hydrogen or mixed gas of hydrogen and argon, the atmospheric gas having a dew point ranging from −60° C. to +20° C., from a distal end side in the travelling direction of the working tube, and the working tube is charged into the furnace and retained at 650 to 1200° C. for 1 to 1200 minutes. At this point, the operation of switching the supply of the atmospheric gas to the inside of the working tube to the supply from another gas supply device after the distal end of the working tube reaches the delivery side of the furnace, is repeated.

Patent Document 6 discloses a method for manufacturing in which a Cr-containing nickel-based alloy tube is treated in an atmosphere made of a nonoxidative gas containing carbon dioxide to form a chromium oxide film having a predetermined thickness on the inner surface of the tube.

LIST OF PRIOR ART DOCUMENTS

Patent Document

Patent Document 1: JP64-55366A
Patent Document 2: JP8-29571A
Patent Document 3: JP2002-121630A
Patent Document 4: JP2002-322553A
Patent Document 5: JP2003-239060A
Patent Document 6: JP2007-284704A Non Patent Document Non-Patent Document 1: Sudesh, Wijesinghe and Blackwood, Photocurrent and capacitance investigations into the nature of the passive films on austenitic stainless steels, Corrosion Science, 50 (2008), p. 23-34

SUMMARY OF INVENTION

Technical Problem

In all of Patent Documents 1 to 6, the improvement in corrosion resistance is achieved by providing a relatively thick film mainly composed of a chromium oxide on a Ni-based alloy surface in the process of manufacturing. By these techniques, the films have excellent prevention effects against the release of Ni when being kept in a sound state. However, when the film becomes detached in actual use, release resistance may be reduced. Additionally, it is likely in working that the film becomes detached during bending.

As to the corrosion resistant mechanism of a Ni-based alloy, it is considered that a film mainly composed of a chromium oxide with high protectability spontaneously forms on the surface of the Ni-based alloy under an actual environment, for example, a reactor cooling water environment at high temperature and pressure, suppressing the release of metal. In order to increase metal release resistance, it is important to form the protective film quickly.

An object of the present invention is to provide a Ni-based alloy tube in which a protective film is quickly formed on the surface thereof under an actual use environment to exert an excellent metal release resistance.

Solution to Problem

The present inventors conducted intensive studies on how to promote passivation, and consequently found that, with respect to the formation of the protective film described above, performing heat treatment in a manufacturing step of the Ni-based alloy tube in advance to form an appropriate low Cr content complex oxide film promotes the formation of the protective film, enhancing the metal release resistance.

The present invention is made based on the finding described above, and a gist of the invention is the following Ni-based alloy tube.

(1) A Ni-based alloy tube comprising a base metal having a chemical composition consisting, by mass percent, of
C: 0.15% or less,
Si: 1.0% or less,
Mn: 2.0% or less,
P: 0.030% or less,
S: 0.030% or less,
Cr: 10.0 to 40.0%,
Ni: 50.0 to 80.0%,
Ti: 0.50% or less,
Cu: 0.60% or less,
Al: 0.20% or less,
N: 0.20% or less, and
the balance: Fe and impurities; and,
a low Cr content complex oxide film having a thickness of 25 nm or smaller at least on an inner surface of the base metal, wherein
contents of Al, Ni, Si, Ti, and Cr in the film satisfy following formulas (i) to (iii):

$$\text{at \% Al/at \% Cr} \leq 2.00 \qquad (i)$$

$$\text{at \% Ni/at \% Cr} \leq 1.40 \qquad (ii)$$

$$(\text{at \% Si} + \text{at \% Ti})/\text{at \% Cr} \geq 0.10 \qquad (iii)$$

where each symbol in the above formula denotes a ratio of a content (at %) of each element to components contained in the low Cr content complex oxide film except O, C, and N.

(2) The Ni-based alloy tube according to the above (1), wherein, in Photoelectrochemical action spectra measured on the low Cr content complex oxide film, a band gap b (eV) that appears within a range of 3.2 to 3.8 eV satisfies a following formula (iv):

$$3.60 < b \leq 3.80 \qquad (iv).$$

(3) The Ni-based alloy tube according to the above (1) or (2), wherein the Ni-based alloy tube is used as a member for nuclear power plant.

Note that the term "low Cr content complex oxide film" refers to a film having a content of Cr accounting for less than 50 at % of components, excluding O, C, and N, contained in the film. The film is an oxide film composed of oxides of a plurality of metallic components, a preliminary film formed through heat treatment in the manufacturing step, which is different from a protective film that is formed under high temperature and high pressured condition in an actual environment.

In addition, the term "photoelectrochemical action spectra" refers to a measurement method of irradiating the low Cr content complex oxide film on the inner surface of the Ni-based alloy tube with light from a light source such as xenon to obtain photocurrent. By analyzing the energy dependence of the photocurrent, it is possible to derive band gap energy which an oxide contained in the film possesses as a semiconducting character.

Advantageous Effects of Invention

According to the present invention, it is possible to obtain a Ni-based alloy tube that is extremely low in the release of a metallic component even under a high-temperature aqueous environment. The Ni-based alloy tube manufactured by the method according to the present invention is extremely low in Ni release even when used under a high-temperature aqueous environment, for example, a high-temperature aqueous environment in a nuclear power plant for a long time, and thus is suitable for a member, such as a heat-transfer tube for steam generators, used in high-temperature water, in particular for a member for nuclear power plant.

DESCRIPTION OF EMBODIMENTS

Hereinafter, the requirements of the present invention will be described in detail.

1. Structure and Composition of Low Cr Content Complex Oxide Film

The Ni-based alloy tube according to the present invention includes, at least on the inner surface of a base metal, a low Cr content complex oxide film having a thickness of 25 nm or less. As previously described, the low Cr content complex oxide film generated in heat treatment in the process of manufacturing spontaneously turns into a protective film which is mainly composed of a chromium oxide under a use environment. A thickness of the low Cr content complex oxide film, which should be referred to as a precursor of the protective film, exceeding 25 nm makes the protective film difficult to be formed, resulting in a reduction in release resistance. In addition, a thickness of the film exceeding 25 nm makes the alloy tube look discolored, which is not preferable. The thickness of the low Cr content complex oxide film is preferably 20 nm or less. The lower limit of the thickness of the low Cr content complex oxide film is not in particular specified but preferably 1 nm or more. The measurement and the evaluation of the film thickness can be performed by direct cross section observation using a TEM, SEM, or the like, or by depth analysis employing XPS, AES, or the like.

As previously described, the low Cr content complex oxide film is composed of oxides of a plurality of metallic components including Cr. The content of Cr needs to account for less than 50 at % of the components of the film except for O, C, and N. This is because, if the amount of Cr becomes 50 at % or more, the film lacks continuity and is prone to be in the form of islands even when the thickness of the film falls within a range of 25 nm or less, which makes the protective film difficult to spontaneously form. The content of Cr is preferably 45 at % or less.

The content of Al in the low Cr content complex oxide film needs to satisfy the following formula (i) in the relation with the content of Cr:

$$\text{at \% Al/at \% Cr} \leq 2.00 \tag{i}$$

where each symbol in the above formula denotes the ratio of the content (at %) of each element to the components contained in the low Cr content complex oxide film except O, C, and N.

Al contained in the low Cr content complex oxide film is estimated to contribute to how easily the low Cr content complex oxide film changes into the protective film. A smaller the value of at % Al/at % Cr leads to a quicker formation of the protective film, resulting in a good corrosion resistance. For this reason, the contents of Al and Cr contained in the low Cr content complex oxide film needs to satisfy the above formula (i). In order to promote the change into the protective film, the value of at % Al/at % Cr is preferably 1.50 or lower, more preferably 0.90 or lower.

The content of Ni in the low Cr content complex oxide film needs to satisfy the following formula (ii) in the relation with the content of Cr:

$$\text{at \% Ni/at \% Cr} \leq 1.40 \tag{ii}$$

where each symbol in the above formula denotes the ratio of the content (at %) of each element to the components contained in the low Cr content complex oxide film except O, C, and N.

A value of at % Ni/at % Cr in the low Cr content complex oxide film exceeding 1.40 leads to failing to suppress the release of Ni when the Ni-based alloy tube is used under a high-temperature aqueous environment for a long period. For this reason, the contents of Ni and Cr contained in the low Cr content complex oxide film needs to satisfy the above formula (ii).

Furthermore, the contents of Si, Ti, and Cr in the low Cr content complex oxide film needs to satisfy the following formula (iii):

$$(\text{at \% Si} + \text{at \% Ti})/\text{at \% Cr} \geq 0.10 \tag{iii}$$

where each symbol in the above formula denotes the ratio of the content (at %) of each element to the components contained in the low Cr content complex oxide film except O, C, and N.

Si and Ti contained in the low Cr content complex oxide film are considered to promote, but in an auxiliary manner, film formation at a very early stage in the protective film formation. For example, the contents of Si, Ti, and Cr contained in the low Cr content complex oxide film preferably satisfy the above formula (iii). The value of (at % Si+at % Ti)/at % Cr in the low Cr content complex oxide film is preferably 0.20 or greater, more preferably 0.35 or greater. On the other hand, a value of (at % Si+at % Ti)/at % Cr exceeding 5.0 causes $Cr_2O_3$ to form compounds other than those with Ti and Si, making the protective film difficult to grow. Therefore, the value of (at % Si+at % Ti)/at % Cr is preferably set at 5.0 or less.

The measurement of the composition of a film can be made simultaneously with depth analysis by XPS, AES, or the like. It is desirable to make the measurement of the depth and the composition of the film at a plurality of points and to employ the average values of the measurements.

Moreover, in the Ni-based alloy tube according to the present invention, in photoelectric polarization photometry on the low Cr content complex oxide film, a band gap b (eV) appearing within a range of 3.2 to 3.8 eV desirably satisfies the following formula (iv).

$$3.60 < b \leq 3.80 \tag{iv}$$

The low Cr content complex oxide film is composed of oxides such as a chromium oxide and a nickel oxide that demonstrate semiconducting properties. It is known that these oxides each have an intrinsic band gap, and the irradiation of light having an energy higher than this band gap on the oxide causes photocurrent to generate. The photoelectrochemical response, called also photoaction spectra, is a measuring method in which the photocurrent is picked up for each irradiation wavelength (i.e., energy) while applying a certain on a sample electrode. The energy dependence of the obtained photocurrent (i.e. photoaction spectrum) is analyzed and subjected to linear transformation, and then the band gap can be derived (e.g., see Non Patent Document 1). By collating this band gap with known information, it is possible to assign an oxide that is contained in the low Cr content complex oxide film and has semiconducting properties.

The instrumentation of the photocurrent can be made by an electrochemical method using three electrodes in a solution. Specifically, the Ni-based alloy tube is cut to a piece having an area of about 1.0 $cm^2$ and made into an electrode as a working electrode. Then, the electrode is immersed in 1.0 N sodium sulfate aqueous solution together with a counter electrode such as platinum. As a reference electrode, a saturated calomel electrode, a silver-silver chloride electrode or the like can be used. Furthermore, the solution is bubbled with an inert gas to reduce the amount of dissolved oxygen to less than 30 ppb.

To the electrode, a monochromatic light beam is applied from a light source having an energy ranging from 3.2 to 3.8 eV (having a wavelength from 388 to 326 nm), and photocurrent is measured. A fixed potential is set at 0 V with respect to the saturated calomel electrode. The generated photocurrent is often feeble and difficult to distinguish from noise current including passivation maintaining current as a background, and thus it is preferable to amplify the photocurrent using a suitable amplifier such as a lock-in amplifier so as to separate the photocurrent from the noise current. In regard to the measurement of the photocurrent, the photocurrent tends to increase at a very early stage immediately after the application of light having a predetermined wavelength, and settle down gradually. As the value of the photocurrent, a value after a lapse of at least 10 s or longer since the application of the light having the wavelength, is employed.

As the light source, any light source such as a xenon lamp may be used as long as the light source can apply light ranging at least from 3.2 to 3.8 eV as a continuous emission spectrum. In addition, the application of the monochromatic light beam is preferably performed at wavelength intervals of 5 nm or shorter, in consideration of data accuracy. The extraction of the monochromatic light beam is performed using a monochromator, a spectrum filter, or the like and preferably performed with a wavelength half width of 10 nm or shorter.

The photocurrent is obtained by subjecting a photocurrent density (A/$cm^2$) obtained by the application of a light beam at each wavelength to energy compensation. That is, the photocurrent density (A/$cm^2$) obtained at each wavelength is divided by an applied energy (W/$cm^2$) at the wavelength to be normalized (A/W). The amount of energy (mW/$cm^2$) of the applied light at each wavelength is measured using a measuring instrument such as a power meter. There are the cases where the photocurrents have energy intensity dependence on photoirradiation. Therefore, in the case of using the xenon light source, assuming that the energy of the xenon light source is 3.8 eV (a wavelength of 326 nm), an applied energy intensity in the present invention needs to be within a range of 0.2 to 2.0 mW/cm$^2$ with a half width of 10 nm. With the applied energy intensity in such range, the photocurrent is substantially constant.

Conceivable components in the low Cr content complex oxide film that generates photocurrent in response to the light having 3.8 eV (the wavelength of 326 nm) specified in the present invention include a chromium oxide (e.g., $Cr_2O_3$), a nickel oxide (e.g., NiO), a nickel hydroxide (e.g., $Ni(OH)_2$), and the like. The photocurrent subjected to the instrumentation shows the summed value of photocurrents from these components. However, in the generation efficiency of photocurrent, a chromium oxide is far higher than a nickel oxide or a nickel hydroxide, and thus most of the photocurrent is considered to be derived from the chromium oxide.

In addition, band gaps can be calculated by analyzing the energy dependence of the photocurrent based on the relation between the photocurrent value and the applied energy and performing linear conversion. In the present invention, as for the band gaps, the value of one appearing within a range of 3.2 to 3.8 eV is employed. Within a range exceeding 3.8 eV, components other than the chromium oxide become responsive, which is not preferable. In addition, considering that the band gap of $Cr_2O_3$ in the form of a pure single component is 3.2 eV, a chromium oxide that is responsive to 3.2 eV or higher is estimated to be a fine chromium oxide particle having the quantum size effect, which is preferable for the formation of a protective film. In contrast, a chromium oxide particle that is responsive at less than 3.2 eV coarsens and makes the formation of a uniform protective film difficult, which is not preferable.

In the case where a plurality of band gaps appears within the range of 3.2 to 3.8 eV, the value of a band gap having a higher energy of the band gaps is employed. Semiconductor components having band gaps within this range are chromium oxides.

2. Chemical Composition

The reasons for limiting the content of each element are as follows. Note that the unit "%" accompanying each content in the following description represents "mass %".

C: 0.15% or Less

C (carbon) is an element having an effect of increasing the grain boundary strength of the alloy. However, containing more than 0.15% of C leads to a degradation in stress corrosion cracking resistance. Consequently, the content of C is set at 0.15% or less. The content of C is desirably set at 0.06% or less. In order to obtain the effect described above, the content of C is desirably set at 0.01% or more.

Si: 1.0% or Less

Si (silicon) is used as a deoxidizer in smelting and remains in the alloy in the form of an impurity. An excessively high content leads to a reduction in the cleanliness of the alloy. Therefore, the content of Si is set at 1.0% or less. The content of Si is desirably set at 0.5% or less. The effect of Si as a deoxidizer becomes most pronounced when the content of Si is 0.02% or more. The content of Si is more desirably 0.05% or more.

Mn: 2.0% or Less

Mn (manganese) immobilizes S in the form of MnS, therefore being an element effective in securing hot workability. However, excessive containing of Mn leads to a reduction in corrosion resistance of the alloy. Consequently, the content of Mn is set at 2.0% or less. The content of Mn is desirably set at 1.0% or less. In order to obtain the effect described above, the content of Mn is desirably set at 0.01% or more.

P: 0.030% or Less

P (phosphorus) is an element that exists in the alloy in the form of an impurity. A content of P more than 0.030% leads to an adverse effect on corrosion resistance. Consequently, the content of P is set at 0.030% or less.

S: 0.030% or Less

S (sulfur) is an element that exists in the alloy in the form of an impurity. A content of S more than 0.030% leads to an adverse effect on corrosion resistance. Consequently, the content of S is set at 0.030% or less.

Cr: 10.0 to 40.0%

Cr (chromium) is an element necessary to form an oxide film that is composed of a chromium oxide. In order to form such an oxide film on the surface of the alloy, 10.0% or more of Cr needs to be contained. However, a content of Cr more than 40.0% leads to a degradation in workability. Consequently, the content of Cr is set at 10.0 to 40.0%. The content of Cr is desirably set at 15.0% or more and desirably set at 35.0% or less.

Ni: 50.0 to 80.0%

Ni (nickel) is an element necessary to secure the corrosion resistance of the Ni-based alloy tube, and 50.0% or more of Ni needs to be contained. At the same time, Ni is expensive, and therefore the content of Ni may be at minimum requirement in conformity with applications of the Ni-based alloy tube. Therefore, the content of Ni is set at 80.0% or less. The content of Ni is desirably set at 55.0% or more and desirably set at 70.0% or less.

Ti: 0.50% or Less

Ti (titanium) is an element effective in improving the workability of the alloy and suppressing grain growth during welding. However, a content of Ti more than 0.50% leads to a degradation in the cleanliness of the alloy. Consequently, the content Ti is 0.50% or less. The content of Ti is desirably set at 0.25% or less. In order to obtain the effect described above, the content of Ti is desirably set at 0.10% or more, more desirably 0.20% or more.

Cu: 0.60% or Less

Cu (copper) is an element that exists in the alloy in the form of an impurity. A content of Cu more than 0.60% leads to the reduction in the corrosion resistance of the alloy. Consequently, the content of Cu is set at 0.60% or less. The content of Cu is desirably set at 0.10% or less.

Al: 0.20% or Less

Al (aluminum) is used as a deoxidizer in steel manufacturing and remains in the alloy in the form of an impurity. In the present invention, as previously described, the ratio of Al in the low Cr content complex oxide film needs to be reduced. To this end, the content of Al in the base metal needs to be reduced. Furthermore, remaining Al turns into oxide inclusions in the alloy, which lead to the degradation in the cleanliness of the alloy, resulting in an adverse effect on the corrosion resistance and the mechanical properties of the alloy. Consequently, the content of Al is set at 0.20% or less. The content of Al is desirably 0.14% or less, more desirably 0.075% or less. An excessively low content of Al leads not only to failing to obtain the effect as a deoxidizer but also to an increase in Ni in the low Cr content complex oxide film, posing the risk of failing to suppress the release of Ni. For this reason, the content of Al is desirably set at 0.01% or more, more desirably 0.04% or more. The content of Al should be determined with the balance of performance with deoxidation taken into consideration.

N: 0.20% or Less

Although N (nitrogen) does not have to be contained, about 0.001% of N is normally contained as an impurity in the Ni-based alloy tube, the subject of the present invention. Positive containing of N allows the strength of the alloy to be increased without degrading the corrosion resistance. However, containing more than 0.20% of N leads to a reduction of the corrosion resistance. Therefore, if contained, the upper limit of the content of N is set at 0.20%.

The Ni-based alloy tube according to the present invention has the chemical composition consisting of the above elements from C to N described above, and the balance Fe and impurities.

The term "impurities" used herein means components that are mixed in the alloy in producing the alloy industrially due to raw materials such as ores and scraps, and various factors in the producing process and that are allowed to be mixed in the alloy within ranges in which the impurities have no adverse effect on the present invention.

The following two kinds of compositions are representative compositions of the Ni-based alloy tube described above.

(a) A Ni-based alloy tube consisting of C: 0.15% or less, Si: 1.0% or less, Mn: 2.0% or less, P: 0.030% or less, S: 0.030% or less, Cr: 14.0 to 17.0%, Ni: 70.0 to 80.0%, Ti: 0.50% or less, Cu: 0.60% or less, Al: 0.20% or less, and N: 0.20% or less, with the balance being Fe and impurities.

(b) A Ni-based alloy tube consisting of C: 0.06% or less, Si: 1.0% or less, Mn: 2.0% or less, P: 0.030% or less, S: 0.030% or less, Cr: 27.0 to 31.0%, Ni: 55.0 to 65.0%, Ti: 0.50% or less, Cu: 0.60% or less, Al: 0.20% or less, and N: 0.20% or less, with the balance being Fe and impurities.

The Ni-based alloy tube having the composition (a) described above includes 14.0 to 17.0% of Cr and 70.0 to 80.0% of Ni, therefore being an alloy excellent in corrosion resistance under an environment including a chloride. In this alloy, the content of Fe is desirably set at 6.0 to 10.0% from the viewpoint of striking a balance between the content of Ni and the content of Cr.

The Ni-based alloy tube having the composition (b) described above includes 27.0 to 31.0% of Cr and 55.0 to 65.0% of Ni, therefore being an alloy excellent in corrosion resistance under an environment including a chloride as well as a pure water environment and an alkaline environment at high temperatures. Also in this alloy, the content of Fe is desirably set at 7.0 to 11.0% from the viewpoint of striking a balance between the content of Ni and the content of Cr.

3. Manufacturing Method

As a method for manufacturing the Ni-based alloy tube according to the present invention, it is simple and preferable to employ, for example, a method in which the Ni-based alloy tube is heated in an atmosphere containing an oxidative gas to form a low Cr content complex oxide film on the inner surface of the Ni-based alloy tube. Specifically, a temperature and a time are controlled in annealing treatment (FMA), and further heating is performed in special heat treatment (TT) while controlling a temperature, a time, and an oxidative gas concentration (partial pressure). By performing the heat treatment in appropriate conditions, it is possible to adjust, in the TT, the components based on the oxide film generated in the FMA while thickening the oxide film.

Other methods for manufacturing the Ni-based alloy tube include physical vapor deposition and wet coating, which provides a predetermined film. Specific description will be made below with regard to the method in which the heat treatment is performed in the atmosphere containing the oxidative gas, but the method for manufacturing the Ni-based alloy tube according to the present invention is not limited to the following method.

<Atmosphere>

The atmosphere during the heating is assumed to be an atmosphere of nonoxidative gas or vacuum containing a prescribed amount of an oxidative gas. Examples of the nonoxidative gas include hydrogen gas, a noble gas (e.g., Ar, He), carbon monoxide gas, nitrogen gas, a hydrocarbon gas, and the like. Examples of the oxidative gas contained in these gases include oxygen, steam, or the like. A proper concentration of oxygen or steam varies depending on a heating temperature and may be set appropriately so that an intended low Cr content complex oxide film is formed.

In contrast, under vacuum, the concentration (partial pressure) of the contained oxidative gas varies depending on the degree of vacuum, and thus the degree of vacuum needs to be managed so that a proper film is provided. When the film is provided in the special heat treatment, the degree of vacuum is preferably about $5.0 \times 10^{-3}$ Pa to $1.0 \times 10^{-5}$ Pa. That is, the oxygen partial pressure is preferably set at about $1.0 \times 10^{-3}$ Pa to $2.0 \times 10^{-6}$ Pa. A low degree of vacuum (i.e., a high pressure) leads to not only an increase in the thickness of the low Cr content complex oxide film but also an increase in Ni in the low Cr content complex oxide film, posing the risk of failing to suppress the release of Ni. For this reason, the degree of vacuum is preferably set at $1.0 \times 10^{-3}$ to $1.0 \times 10^{-5}$ Pa.

In order to form the low Cr content complex oxide film of the present invention, it is necessary to increase the ratio of the amount of Cr in the film while suppressing the generation of oxides of Al and Ni. That is, it is necessary to oxidize Cr selectively. However, the degree of vacuum is easily affected by the disturbance, and thus the degree of vacuum is prone to fluctuate when the treatment takes a long time. The selective oxidation of Cr can be achieved, for example, through treatment performed under the conditions that are predicted based on the equilibrium oxygen partial pressure in M+O↔MO (M: metal). Specifically, examples of such treatment include a method in which a sample is wrapped with a proper pure metal and heated under vacuum.

The sample surrounded with the pure metal does not directly suffer the oxidation of the oxidative gas. The oxidation of an element contained in the sample proceeds in the case where the element is oxidized easier than the pure metal. In other words, the oxidation behavior of the sample is determined based on the differences between the thermodynamic stabilities of oxides between the pure metal used and the elements in the sample. The tendencies of metals to be oxidized are in order of Al>Ti>Cr>Ni.

In a heat treatment environment at high temperature, the reaction velocity of a metal is high, and thus it is considered that oxidation/reduction reaches an equilibrium in the vicinity of the surface of the pure metal. Here, the equilibrium oxygen partial pressure depends on the kind of the pure metal and a heat treatment temperature. The higher the equilibrium oxygen partial pressure is, the more the oxidizing rate of the sample is increased. That is, the heat treatment is desirably performed under an environment where Cr or Ni exists in the vicinity of an alloy tube. In order to form a low Cr content complex oxide film having an appropriate thickness, the heat treatment is more desirably performed under an environment where a material containing Cr (e.g., another Ni-based alloy tube) exists in the vicinity of the alloy tube.

<Heating Conditions>

Although the heat treatment temperature is subject to no special limitations but may be within a range within which it is possible to obtain an appropriate thickness and composition of the oxide film, as well as appropriate strength properties of the alloy tube, and the range is preferably a temperature range of 700 to 1150° C. In addition, a heating time period depends on the temperature range but is preferably set at 1 min or longer. In particular, for Ni base alloy tubes for nuclear power, it is preferable to form the film by performing the TT after the FMA and controlling the concentration of the oxidative gas in the process of the TT. The heating conditions in the heat treatments are as follows.

In the FMA, the heating temperature is preferably set within a range of 1000 to 1150° C. A heating temperature of less than 1000° C. may lead to insufficient oxidation of the metal. In order to obtain the film having a proper film thickness in a proper time, the heating temperature is preferably set at 1000° C. or higher. On the other hand, a heating temperature of more than 1150° C. poses the risk of failing to secure the strength of the alloy tube. The heating temperature is preferably 1070° C. or higher, more preferably 1100° C. or lower.

In addition, the heating time period is desirably set at 1 min or longer. The upper limit of the heating time period is not particularly determined, but at least within a temperature range of 1000 to 1150° C., heating for more than 60 min makes the film thickness exceed a predetermined thickness and has a disadvantage also in terms of manufacturing cost. Therefore, the heating time period is desirably set within 60 min.

Meanwhile, in the TT, the heating temperature may be a temperature allowing the stress corrosion cracking resistance to be given but is preferably set within a range of 700 to 750° C. in terms of metal release resistance. A heating temperature of lower than 700° C. leads to oxidative properties that are too poor to form a Cr oxide in the low Cr content complex oxide film, and a heating temperature of higher than 750° C. leads to an increase in the amount of Al in the film and an excessively large thickness of the film, resulting in an insufficient corrosion resistance.

The heating time period may be set in the light of the heating temperature so that a desired low Cr content complex oxide film is formed, and specifically, the heating time period is preferably set at 5 to 25 h. A heating time period of less than 5 h leads to an unstable film. On the other hand, a heating time period of more than 25 h leads to excessive oxidation, which is economically disadvantageous furthermore.

On the surface of the Ni-based alloy tube, the complex oxide film is formed immediately after tube-making that is performed with the addition of heat. By performing the FMA and the TT described above under proper conditions, the complex oxide film described above is reconfigured or grows, turning into the low Cr content complex oxide film specified in the present invention.

<Length and Inner Diameter of Tube>

The Ni-based alloy tube manufactured under the heat treatment conditions specified in the present invention is suitable for a heat-transfer tube for steam generators used in a nuclear plant, the heat-transfer tube having a tube length of 5 to 50 m, and a tube inner diameter of 10 to 30 mm.

Hereafter, the present invention will be described more specifically by way of examples, but the present invention is not limited to these examples.

EXAMPLE (1) Fabricating Ni-Based Alloy Tube

Material tubes to be subjected to experiment were manufactured by the following manufacturing method. First, melting and casting were performed in vacuum on alloys having the chemical compositions shown in Table 1 to obtain ingots. These ingots were subjected to hot forging to be made into billets and thereafter subjected to a hot-extrusion tube-making process to be shaped into tubes. The tubes obtained in such a manner were subjected to cold rolling using a cold Pilger mill to have an outer diameter of 23.0 mm and a wall thickness of 1.4 mm. Subsequently, the tubes after the cold rolling were subjected to anneal in a hydrogen atmosphere at 1100° C. and thereafter subjected to a cold drawing process to be finished in the form of tubes having product dimensions of an outer diameter: 19.0 mm, a wall thickness 1.0 mm, and a length: 20000 mm (the reduction in area=50%). Afterward, the tubes were cut to a necessary length, then the inner and outer surface of each tube were washed using alkaline degreasing solution and rinse water, and further the inner surface of each tube was subjected to acetone cleaning.

[Table 1]

TABLE 1

| Alloy | Chemical composition (in mass %, balance: Fe and impurities) | | | | | | | | | | |
| --- | --- | --- | --- | --- | --- | --- | --- | --- | --- | --- | --- |
| | C | Si | Mn | P | S | Cr | Ni | Ti | Cu | Al | N |
| A | 0.018 | 0.33 | 0.22 | 0.013 | 0.0004 | 29.59 | 60.15 | 0.240 | 0.040 | 0.140 | 0.008 |
| B | 0.019 | 0.34 | 0.29 | 0.014 | 0.0002 | 29.17 | 60.28 | 0.248 | 0.030 | 0.075 | 0.005 |
| C | 0.018 | 0.33 | 0.23 | 0.013 | 0.0004 | 29.74 | 60.00 | 0.240 | 0.040 | 0.033 | 0.008 |
| D | 0.020 | 0.37 | 0.30 | 0.001 | 0.0005 | 29.81 | 59.60 | 0.250 | 0.040 | 0.230 * | 0.004 |
| E | 0.018 | 0.33 | 0.23 | 0.013 | 0.0005 | 29.60 | 60.20 | 0.025 | 0.040 | <0.001 | 0.007 |

* indicates that conditions do not satisfy those defined by the present invention.

After being cut to the necessary length, the obtained material tubes of Test Nos. 1 to 15 were subjected to the heat treatment (anneal: FMA) in $H_2$ gas and further subjected to the special heat treatment (TT) under vacuum. Through the two heat treatments, the material tubes were each made to have a low Cr content complex oxide film formed on the inner surface thereof. Table 2 shows the conditions of the heat treatments. The temperatures of the anneal treatment were set within a temperature range of 1000 to 1300° C., and with the temperature range taken into consideration, the heating time periods were set to 10 to 15 min. In the TT, the samples inclusive of both openings of the tubes were doubly wrapped with Ni foil, Cr foil, or Ti foil and thereafter subjected to heat treatment under vacuum ($1 \times 10^{-4}$ Pa) under a temperature condition of 675 to 740° C. The usage of each foil was set at an area four times or more of the outer surface of the Ni-based alloy tubes. In addition, the opening of the foil was set at 0.25 $cm^2$ or smaller. By wrapping sample with metallic foil, it is possible to avoid the influence of disturbance even in the vacuum treatment, thereby keeping a predetermined oxygen partial pressure in conformity with the material quality of the metallic foil.

For Test No. 16, the FMA and the TT were not performed, and for Test No. 17, only the FMA was performed. For Test No. 18, the FMA and the TT were performed under the conditions as with Test No. 6 except that the degree of vacuum was set at $6.7 \times 10^{-3}$ Pa.

[Table 2]

TABLE 2

| Test No. | Alloy | FMA Heating temperature (° C.) | FMA Heating time (min) | TT Heating temperature (° C.) | TT Heating time (h) | Degree of vacuum (Pa) | Foil |
|---|---|---|---|---|---|---|---|
| 1 | A | 1100 | 10 | 725 | 10 | $1.0 \times 10^{-4}$ | Cr |
| 2 | A | 1000 | 10 | 725 | 10 | $1.0 \times 10^{-4}$ | Cr |
| 3 | A | 1100 | 10 | 740 | 15 | $1.0 \times 10^{-4}$ | Cr |
| 4 | A | 1075 | 10 | 715 | 15 | $1.0 \times 10^{-4}$ | Cr |
| 5 | A | 1100 | 10 | 725 | 7.5 | $1.0 \times 10^{-4}$ | Ni |
| 6 | A | 1050 | 15 | 700 | 15 | $1.0 \times 10^{-4}$ | Cr |
| 7 | B | 1100 | 10 | 725 | 10 | $1.0 \times 10^{-4}$ | Cr |
| 8 | C | 1100 | 10 | 725 | 10 | $1.0 \times 10^{-4}$ | Cr |
| 9 | A | 1300 | 10 | 725 | 10 | $1.0 \times 10^{-4}$ | Cr |
| 10 | A | 1100 | 10 | 725 | 10 | $1.0 \times 10^{-4}$ | Ni |
| 11 | A | 1100 | 10 | 725 | 10 | $1.0 \times 10^{-4}$ | Ti |
| 12 | C | 1300 | 10 | 725 | 10 | $1.0 \times 10^{-4}$ | Cr |
| 13 | C | 1100 | 10 | 675 | 10 | $1.0 \times 10^{-4}$ | Cr |
| 14 | D * | 1100 | 10 | 725 | 10 | $1.0 \times 10^{-4}$ | Cr |
| 15 | E * | 1050 | 15 | 700 | 15 | $1.0 \times 10^{-4}$ | Cr |
| 16 | A | — | — | — | — | — | — |
| 17 | A | 1100 | 10 | — | — | — | — |
| 18 | A | 1050 | 15 | 700 | 15 | $6.7 \times 10^{-3}$ | Cr |

\* indicates that condititons do not satisfy those defined by the present invention.

(2) Measurement of Thickness and Composition of Low Cr Content Complex Oxide Film The thickness and the composition of each low Cr content complex oxide film were measured simultaneously by depth analysis employing XPS. Table 3 shows both the thicknesses and the compositions of the low Cr content complex oxide film formed on the inner surface of each Ni-based alloy tube. Each value about the thickness and the composition shown in Table 3 is the average value of the results of the measurement made at certain three points.

(3) Photoelectric Polarization Photometry

The test was conducted in such a manner that, in 0.5 mol/L-Na$_2$SO$_4$ aqueous solution under deaerated conditions, a sample made into an electrode of 1 cm$^2$ is used as a working electrode, a platinum electrode is used as a counter electrode, and saturated calomel (SCE) is used as reference electrode. From a xenon lamp (300 W) through a monochromator, monochromatic light beams within a range of 250 to 500 nm were applied every 5 nm from the short wavelength side of the range, and photocurrents were subjected to instrumentation. At this point, the application of the monochromatic light beams was performed intermittently using a chopper, and photocurrents were extracted using a lock-in amplifier with the rotation speed of the chopper, 20 rpm, used as a monitor signal. The fixed potential of the working electrode was set at 0.0 V (vs. SCE).

Figure 1:
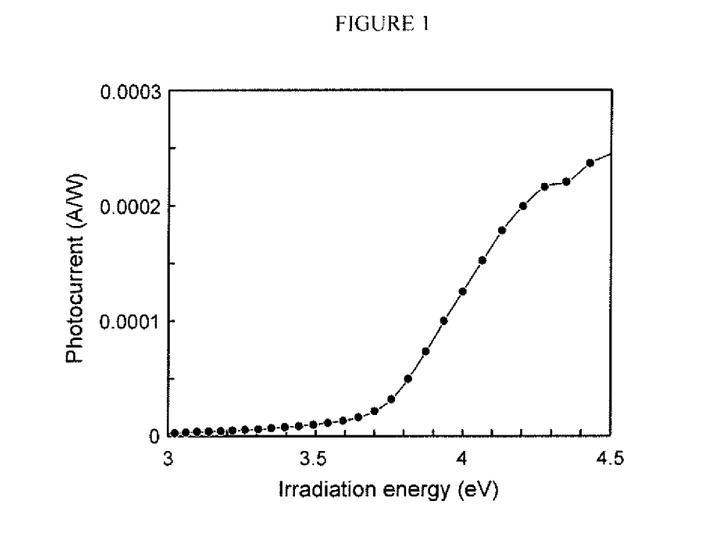
FIG. 1 is a graph illustrating the irradiation energy dependence of photocurrent of a Test No. 2.
Figure 2:
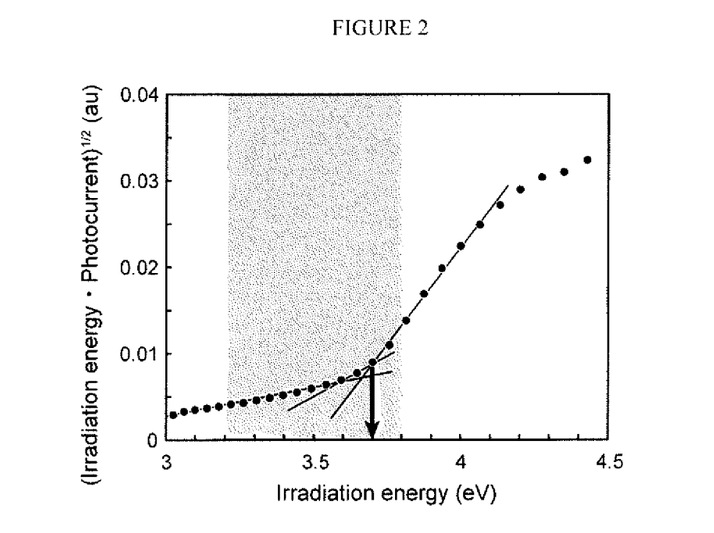
FIG. 2 is a graph illustrating the result of carrying out linear transforming regression analysis on the relation between photocurrent and irradiation energy in the Test No. 2.

FIG. 1 is a graph illustrating the energy dependence of photocurrent (photoelectrochemical action spectra) of Test No. 2. Each value of photocurrent is normalized by an applied energy of each wavelength and expressed as a current value per 1 W (A/W). In addition, FIG. 2 illustrates the result of carrying out linear regression analysis on FIG. 1. The analysis of a band gap was carried out in the following procedure. As illustrated in FIG. 2, two straight lines are drawn so as to intersect at a component to be a subject having the largest band gap, of components having band gaps within a predetermined range (3.2 to 3.8 eV), and other straight lines are drawn so as to intersect a second component having the second largest band gap. Then, the value of a band gap having a higher energy of the energy values of the intersections is employed. As a result, a value of 3.70 eV was obtained from FIG. 2 as the value of the band gap. Table 3 shows the values of band gaps together.

(4) Measurement of Release Amount of Ni

Test specimens of the specimen tubes (1000 mm in length) after being subjected to the heat treatments described above were subjected to release test. In the release test, a circulation autoclave was used, and on the inner surface of each specimen tube, 1000 ppm B+2 ppm Li+30 cc H$_2$/kg H$_2$O (STP), which is a simulated reactor primary water, was made to flow at 300° C. for 100 h or longer. In this test, solution flowing from specimen tube was sampled by making it flow through an ion exchange filter for about 1 h, after about 20 h (t1), about 50 h (t2), and about 120 h (t3), and released Ni was extracted. Then, the amount of Ni contained in each filter was measured by an atomic absorption method. Then, with a1, a2, and a3 denoting values obtained by dividing the amounts of Ni obtained at times t1, t2, and t3 by the respective sampling times, the release amount of Ni after 100 h was calculated by the formula "a1×t1+a2×(t2−t1)+a3×(100−t2)". Table 3 shows the release amounts of Ni together. In the present invention, test specimens having release amounts of Ni of less than 0.010 g/m$^2$ were determined to be excellent in Ni release resistance.

[Table 3]

TABLE 3

| Test No. | Alloy | Film thickness (nm) | Content of each element contained in the Low Cr content complex oxide film# (at %) Al | Si | Ti | Cr | Fe | Ni | Al/Cr | Ni/Cr | (Si + Ti)/Cr | Band gap (eV) | Release amount of Ni (g/m$^2$) | |
|---|---|---|---|---|---|---|---|---|---|---|---|---|---|---|
| 1 | A | 12.21 | 35.80 | 7.82 | 9.88 | 25.93 | 0.00 | 20.58 | 1.38 | 0.79 | 0.68 | 3.70 | 0.005 | Inventive |
| 2 | A | 14.52 | 30.64 | 1.67 | 3.33 | 28.55 | 3.20 | 32.62 | 1.07 | 1.14 | 0.18 | 3.70 | 0.009 | example |
| 3 | A | 10.52 | 37.62 | 3.52 | 12.62 | 20.14 | 3.57 | 22.52 | 1.87 | 1.12 | 0.80 | 3.74 | 0.009 | |

TABLE 3-continued

| Test No. | Alloy | Film thickness (nm) | Content of each element contained in the Low Cr content complex oxide film# (at %) | | | | | | Al/Cr | Ni/Cr | (Si + Ti)/Cr | Band gap (eV) | Release amount of Ni (g/m$^2$) | |
|---|---|---|---|---|---|---|---|---|---|---|---|---|---|---|
| | | | Al | Si | Ti | Cr | Fe | Ni | | | | | | |
| 4 | A | 4.21 | 34.36 | 4.96 | 9.62 | 29.46 | 0.00 | 21.60 | 1.17 | 0.73 | 0.50 | 3.75 | 0.006 | |
| 5 | A | 22.53 | 23.51 | 2.60 | 10.09 | 27.12 | 0.26 | 36.41 | 0.87 | 1.34 | 0.47 | 3.65 | 0.004 | |
| 6 | A | 17.50 | 36.90 | 3.95 | 8.75 | 23.77 | 3.32 | 23.30 | 1.55 | 0.98 | 0.53 | 3.66 | 0.009 | |
| 7 | B | 12.03 | 27.40 | 3.21 | 5.90 | 34.26 | 1.69 | 27.54 | 0.80 | 0.80 | 0.27 | 3.70 | 0.003 | |
| 8 | C | 15.10 | 17.72 | 3.17 | 7.90 | 31.65 | 5.50 | 34.07 | 0.56 | 1.08 | 0.35 | 3.74 | 0.001 | |
| 9 | A | 2.13 | 35.23 | 6.12 | 20.56 | 15.72 | 5.69 | 16.67 | 2.24 * | 1.06 | 1.70 | 3.58 | 0.034 | Comparative example |
| 10 | A | 26.13 * | 20.35 | 3.25 | 12.71 | 28.00 | 0.41 | 35.27 | 0.73 | 1.26 | 0.57 | 3.58 | 0.024 | |
| 11 | A | 4.32 | 43.35 | 12.94 | 6.73 | 21.03 | 0.55 | 15.41 | 2.06 * | 0.73 | 0.94 | 3.70 | 0.016 | |
| 12 | C | 2.85 | 23.54 | 5.81 | 18.52 | 19.01 | 5.69 | 27.43 | 1.24 | 1.44 * | 1.28 | 3.64 | 0.018 | |
| 13 | C | 9.52 | 20.29 | 12.31 | 5.62 | 23.00 | 1.03 | 37.74 | 0.88 | 1.64 * | 0.78 | 3.57 | 0.025 | |
| 14 | D * | 10.50 | 45.63 | 4.26 | 8.35 | 13.29 | 5.34 | 23.13 | 3.43 * | 1.74 * | 0.95 | 3.59 | 0.031 | |
| 15 | E * | 22.10 | — | 5.13 | — | 39.05 | 5.57 | 50.24 | — | 1.29 * | 0.13 | 3.62 | 0.021 | |
| 16 | A | 1.50 | 7.12 | 0.50 | 1.10 | 42.51 | 6.64 | 42.13 | 0.17 | 0.99 | 0.04 * | 3.55 | 0.021 | |
| 17 | A | 8.90 | 36.53 | 15.06 | 10.61 | 17.52 | 0.16 | 20.12 | 2.09 * | 1.15 | 1.47 | 3.62 | 0.015 | |
| 18 | A | 28.80 * | 18.52 | 3.25 | 12.26 | 24.62 | 2.54 | 38.85 | 0.75 | 1.58 * | 0.63 | 3.58 | 0.040 | |

* indicates that conditions do not satisfy those defined by the present invention.
indicates a ratio of a content of each element to components contained in the Low Cr content complex oxide film except O, C, and N.

As shown in Table 3, as to Test Nos. 1 to 8, which are inventive examples of the present invention, the conditions of the FMA and the TT were appropriate, and the foils of Cr or Ni, the oxide of which is relatively low in thermodynamic stability, were used in the TT, and thus appropriate low Cr content complex oxide films could be formed. Then, they had release amounts of Ni of less than 0.010 g/m$^2$ and were found to be excellent in Ni release resistance.

In contrast, as to Test No. 9, which was a comparative example, the conditions of the TT were appropriate, but the heating temperature of the FMA were excessively high, which caused a reduction in Cr and failed to obtain $Cr_2O_3$ in a sufficient amount. That leads to increase in Al/Cr, thus resulting in a degraded Ni release resistance. As to Test No. 10, the Ni foil, the oxide of which has a low thermodynamic stability, was used in the TT, and thus the values of Al/Cr and Ni/Cr were low. However, the oxidation reaction progressed actively, resulting in a film thickness exceeding the specified range. As a result, the value of the band gap was low, and normal film growth was inhibited, resulting in a poor Ni release resistance. In addition, discoloration was recognized on the film.

It is considered that, in the case of using the Cr foil, the oxygen potential of the Cr foil is substantially the same as that of the alloy tube, and thus the oxidation progressed slowly. In contrast to this, it is considered that, in the case of using the Ni foil, Cr in the alloy tube was selectively oxidized, and thus the film thickness remarkably increased. As seen from the result of Test No. 5, even in the case of using the Ni foil, by shortening the heating time period of the TT, an appropriate film can be formed. In the case where the heat treatments are performed without using the foil of a pure metal, for example, in the case where the heat treatments are performed under an environment where a material containing Cr exists in the vicinity of the alloy tube, such as heat treatment performed with alloy tubes stacked, it is considered that the result is the same as that under the condition that an alloy tube is wrapped with the Cr foil.

As to Test No. 11, the Ti foil, which is relatively easily oxidized in the TT, was used. In the case of using the Ti foil, it is considered that Cr, whose oxide has a thermodynamic stability lower than that of a Ti oxide, is hard to be oxidized in the alloy tube and even reduced in some cases. For this reason, the oxidation of Cr and the like did not progress, and the oxidation of Al preferentially occurred, which increased the value of Al/Cr in the film, resulting in a poor Ni release resistance. As to Test No. 12, due to the high heating temperature in the FMA, the value of Ni/Cr in the film was increased, resulting in a poor release resistance. As to Test No. 13, due to the low heating temperature in the TT, the oxidation of Cr was insufficient, which relatively increased the value of Ni/Cr, resulting in a poor release resistance.

As to Test No. 14, the heat treatment condition was appropriate, but the content of Al in the base metal was out of the specification of the present invention, which increases the value of Al/Cr as well as the value of Ni/Cr, resulting in a poor release resistance. As to Test No. 15, due to no Al contained in the base metal, the value Ni/Cr was increased, resulting in a poor release resistance.

As to Test No. 16, the test specimen was in the state of a material tube on which neither FMA nor TT was performed, and thus the value of (Si+Ti)/Cr was significantly low, therefore resulting in a poor release resistance. It is presumed that the crystallinity of the film was too low to play the role of a precursor of a protective film. As to Test No. 17, the FMA was performed, but the TT was not performed. For this reason, the composition of the film was not reconfigured, which increased the value of Al/Cr, resulting in a poor release resistance. As to Test No. 18, the degree of vacuum in the TT was low (the pressure was high), which led to a film thickness exceeding the specified range and further increased the value of Ni/Cr as well, resulting in a poor release resistance.

INDUSTRIAL APPLICABILITY

According to the present invention, by forming in the heat treatment step a low Cr content complex oxide film, which quickly changes into a protective film under a high-temperature aqueous environment, it is possible to obtain a Ni-based alloy tube extremely low in the release of a metallic component. The Ni-based alloy tube manufactured by the method according to the present invention is extremely low in Ni release even when used under a high-temperature aqueous environment, for example, a high-temperature aqueous environment in a nuclear power plant for a long time, and thus is suitable for a member, such as a heat-transfer tube for steam generators, used in high-temperature water, in particular for a member for nuclear power plant.

What is claimed is:

1. A Ni-based alloy tube comprising a base metal having a chemical composition consisting, by mass percent, of
C: 0.15% or less,
Si: 1.0% or less,
Mn: 2.0% or less,
P: 0.030% or less,
S: 0.030% or less,
Cr: 10.0 to 40.0%,
Ni: 50.0 to 80.0%,
Ti: 0.50% or less,
Cu: 0.60% or less,
Al: 0.20% or less,
N: 0.20% or less, and
the balance: Fe and impurities; and,
a low Cr content complex oxide film having a thickness of 25 nm or smaller at least on an inner surface of the base metal, wherein
contents of Al, Ni, Si, Ti, and Cr in the film satisfy following formulas (i) to (iii):

$$\text{at \% Al/at \% Cr} \leq 2.00 \tag{i}$$

$$\text{at \% Ni/at \% Cr} \leq 1.40 \tag{ii}$$

$$(\text{at \% Si} + \text{at \% Ti})/\text{at \% Cr} \geq 0.10 \tag{iii}$$

where each symbol in the above formula denotes a ratio of a content (at %) of each element to components contained in the low Cr content complex oxide film except O, C, and N.

2. The Ni-based alloy tube according to claim 1, wherein, in photoelectric polarization photometry performed on the low Cr content complex oxide film, a band gap b (eV) that appears within a range of 3.2 to 3.8 eV satisfies a following formula (iv):

$$3.60 < b \leq 3.80 \tag{iv}$$

3. The Ni-based alloy tube according to claim 1, wherein the Ni-based alloy tube is used as a member for nuclear power plant.

4. The Ni-based alloy tube according to claim 2, wherein the Ni-based alloy tube is used as a member for nuclear power plant.

* * * * *